(12) United States Patent
Ross

(10) Patent No.: US 11,840,957 B2
(45) Date of Patent: Dec. 12, 2023

(54) ADAPTIVE LINEAR LINKED PISTON ELECTRIC POWER GENERATOR

(71) Applicant: General Electric Company, Schenectady, NY (US)

(72) Inventor: Jay B. Ross, Lambertville, NJ (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 7 days.

(21) Appl. No.: 17/512,852

(22) Filed: Oct. 28, 2021

(65) Prior Publication Data

US 2022/0049645 A1    Feb. 17, 2022

Related U.S. Application Data

(62) Division of application No. 16/607,189, filed as application No. PCT/US2018/028828 on Apr. 23, 2018, now Pat. No. 11,168,609.

(51) Int. Cl.
*F02B 63/04* (2006.01)
*F02B 71/04* (2006.01)
(Continued)

(52) U.S. Cl.
CPC .......... *F02B 63/041* (2013.01); *F02B 71/04* (2013.01); *H02K 7/1869* (2013.01);
(Continued)

(58) Field of Classification Search
CPC ........ F02B 63/041; F02B 71/04; F02B 75/32; H02K 7/1815; H02K 7/1869; H02K 7/1884; F01B 11/004
See application file for complete search history.

(56) References Cited

U.S. PATENT DOCUMENTS 3,105,153 A * 9/1963 James, Jr. ............... H02K 35/02
                                                    322/3
4,154,200 A * 5/1979 Jarret ....................... F02B 75/04
                                                    290/1 R
(Continued)

FOREIGN PATENT DOCUMENTS

CN      106224095 A    12/2016
DE      3913806 A1 *   11/1989    ............... B60K 6/24
(Continued)

OTHER PUBLICATIONS

International Search Report for PCT/US2018/028828, dated Sep. 14, 2018.
(Continued)

*Primary Examiner* — Pedro J Cuevas
(74) *Attorney, Agent, or Firm* — MEAGHER EMANUEL LAKS GOLDBERG & LIAO, LLP

(57) ABSTRACT

A load adaptive linear electrical generator system is provided for generating DC electrical power. The electrical generation system includes one or more power generation modules which will be selectively turned on or off and additively contribute power depending on the DC power demand. Each power generating module includes a pair of linear electrical generators connected to respective ones of a pair of internal combustion piston based power assemblies. The piston in the internal combustion assembly is connected to a magnet in the linear electrical generator. The piston/magnet assembly oscillates in a simple harmonic motion at a frequency dependent on a power load of the electrical generator. A stroke limiter constrains the piston/magnet assembly motion to preset limits.

8 Claims, 13 Drawing Sheets

Related U.S. Application Data

(60) Provisional application No. 62/488,990, filed on Apr. 24, 2017.

(51) Int. Cl.
| | | |
|---|---|---|
| *H02K 7/18* | (2006.01) | |
| *H02P 9/00* | (2006.01) | |
| *H02P 9/06* | (2006.01) | |
| *H02P 9/08* | (2006.01) | |
| *H02P 101/25* | (2016.01) | |

(52) U.S. Cl.
CPC .......... *H02K 7/1884* (2013.01); *H02P 9/008* (2013.01); *H02P 9/06* (2013.01); *H02P 9/08* (2013.01); *H02P 2101/25* (2015.01)

(56) References Cited

U.S. PATENT DOCUMENTS

| | | | |
|---|---|---|---|
| 4,385,597 A | 5/1983 | Stelzer | |
| 4,532,431 A * | 7/1985 | Iliev | H02K 35/04 290/40 R |
| 4,568,251 A | 2/1986 | Braun | |
| 4,631,455 A * | 12/1986 | Taishoff | F02N 11/04 318/128 |
| 4,642,547 A * | 2/1987 | Redlich | H02P 9/04 322/3 |
| 5,002,020 A * | 3/1991 | Kos | B60L 15/20 123/3 |
| 5,775,273 A * | 7/1998 | Beale | F02B 71/04 123/46 B |
| 6,242,873 B1 | 6/2001 | Drozdz | |
| 6,278,204 B1 | 8/2001 | Frenette | |
| 6,541,875 B1 * | 4/2003 | Berlinger | H02K 7/1884 290/1 R |
| 7,250,697 B2 * | 7/2007 | Beaulieu | F16F 1/13 310/15 |
| 7,258,086 B2 | 8/2007 | Fitzgerald | |
| 7,338,335 B1 | 3/2008 | Messano | |
| 7,363,887 B2 * | 4/2008 | Jacobsen | F02B 71/04 123/46 R |
| 7,501,725 B2 * | 3/2009 | Parker | H02K 7/06 310/34 |
| 7,602,155 B2 | 10/2009 | Markowski | |
| 7,777,357 B2 * | 8/2010 | Hyde | B60L 50/40 290/1 A |
| 7,793,634 B2 * | 9/2010 | Elmaleh | F02B 63/04 123/197.1 |
| 7,808,313 B2 | 10/2010 | Markowski | |
| 7,856,714 B2 * | 12/2010 | Hyde | B60K 6/24 29/888.011 |
| 7,859,336 B2 | 12/2010 | Markowski | |
| 7,950,356 B2 * | 5/2011 | Hyde | F02B 75/28 290/1 R |
| 7,990,214 B2 | 8/2011 | Markowski | |
| 8,037,852 B2 * | 10/2011 | Hyde | B60L 15/2009 290/1 A |
| 8,151,745 B2 * | 4/2012 | Hyde | F02B 75/042 310/46 |
| 8,432,047 B2 * | 4/2013 | Schilling | F01B 23/10 290/1 R |
| 8,601,685 B2 * | 12/2013 | Hyde | B60K 6/485 29/888.011 |
| 8,704,387 B2 * | 4/2014 | Lemieux | F03G 7/08 290/1 R |
| 8,726,857 B2 * | 5/2014 | Wood | F02D 39/10 123/3 |
| 8,874,291 B2 * | 10/2014 | Gresser | B60L 8/00 180/65.265 |
| 8,991,340 B2 * | 3/2015 | Wood | F02B 63/041 290/1 R |
| 9,228,490 B2 * | 1/2016 | Wood | F02B 63/04 |
| 9,350,175 B2 | 5/2016 | Subramaniam et al. | |
| 10,348,096 B2 | 7/2019 | Huomo | |
| 11,404,937 B2 * | 8/2022 | Svrcek | F02B 71/04 |
| 2004/0030469 A1 | 2/2004 | macBain | |
| 2005/0028520 A1 | 2/2005 | Chertok | |
| 2006/0124083 A1 | 6/2006 | Niiyama | |
| 2006/0130782 A1 | 6/2006 | Boland | |
| 2006/0144041 A1 * | 7/2006 | Jacobsen | F02B 71/04 60/413 |
| 2006/0185631 A1 | 8/2006 | Fitzgerald | |
| 2007/0024360 A1 | 2/2007 | Markowski | |
| 2008/0036312 A1 * | 2/2008 | Max | F02D 29/06 123/46 R |
| 2008/0079320 A1 * | 4/2008 | Beaulieu | F02B 63/04 310/15 |
| 2008/0098972 A1 * | 5/2008 | Elwart | B60K 13/04 123/46 E |
| 2008/0224769 A1 | 9/2008 | Markowski | |
| 2009/0090334 A1 | 4/2009 | Hyde et al. | |
| 2009/0091138 A1 * | 4/2009 | Hyde | F02B 63/04 290/1 R |
| 2009/0091195 A1 * | 4/2009 | Hyde | H02K 7/1884 310/16 |
| 2009/0094827 A1 * | 4/2009 | Hyde | F02B 71/04 29/888.011 |
| 2009/0184764 A1 | 7/2009 | Markowski | |
| 2009/0261908 A1 | 10/2009 | Markowski | |
| 2009/0322098 A1 | 12/2009 | Cohen | |
| 2010/0187031 A1 * | 7/2010 | Waszak | B60W 20/12 903/905 |
| 2010/0289263 A1 * | 11/2010 | Hyde | B60L 50/16 290/41 |
| 2011/0174271 A1 * | 7/2011 | Wood | F02B 71/04 123/46 E |
| 2011/0309675 A1 | 12/2011 | Eger | |
| 2012/0007449 A1 | 1/2012 | Gosvener | |
| 2013/0186354 A1 | 7/2013 | Torkildsen | |
| 2014/0018206 A1 | 1/2014 | Bernhardt | |
| 2014/0209067 A1 * | 7/2014 | Wood | F02G 1/0435 123/46 E |
| 2014/0283511 A1 * | 9/2014 | Wood | H02K 7/1884 60/520 |
| 2015/0307796 A1 * | 10/2015 | Wood | F02D 39/10 422/187 |
| 2015/0311749 A1 | 10/2015 | Frampton | |
| 2016/0010544 A1 | 1/2016 | Hamann et al. | |
| 2016/0208686 A1 * | 7/2016 | Gadda | F02B 63/041 |
| 2016/0215689 A1 * | 7/2016 | Wood | H02K 7/18 |
| 2018/0258845 A1 * | 9/2018 | Rainey | F02B 63/041 |
| 2020/0036273 A1 * | 1/2020 | Lawler | F16C 32/0618 |
| 2020/0195093 A1 * | 6/2020 | Svrcek | F02B 71/04 |
| 2022/0399784 A1 * | 12/2022 | Svrcek | F02B 71/04 |

FOREIGN PATENT DOCUMENTS

| | | | |
|---|---|---|---|
| EP | 1316457 A1 | 6/2003 | |
| EP | 2988386 A1 | 2/2016 | |
| FR | 3027057 A1 | 4/2016 | |
| GB | 2219671 A * | 12/1989 | .............. B60K 6/22 |
| JP | S57-44732 A2 | 3/1982 | |
| JP | 2008057383 A | 3/2008 | |
| JP | 2008223628 A | 9/2008 | |
| WO | 01088353 A1 | 11/2001 | |
| WO | WO-2009045521 A1 * | 4/2009 | .............. B60K 6/24 |
| WO | WO-2011091022 A1 * | 7/2011 | .............. F02B 63/04 |
| WO | 2014135198 A1 | 9/2014 | |
| WO | WO-2020132150 A1 * | 6/2020 | ............ F01B 11/003 |

OTHER PUBLICATIONS

Written Opinion for PCT/US2018/028828, dated Sep. 14, 2018.
European Search Report for corresponding EP Application No. 18791526, dated Oct. 5, 2020.
European Search Report for corresponding EP Application No. 22163067.6, dated Jul. 18, 2022.
JP Office Action for JP Application No. 2010-009602, dated Nov. 26, 2013.

(56) References Cited

OTHER PUBLICATIONS

European Search Report for EP Application No. 10150930.5, dated Oct. 17, 2017.

* cited by examiner

LPEG Piston Position vs Resolver Angle

Resolver 1:1 Gear Ratio

Normalized with R=1

LPEG Piston 1 Position vs Resolver Angle

Resolver 1:2 Gear Ratio

Normalized with R=1

LPEG-2 Single Cylinder Sequencing Schedule

4 Stroke Cycle Sequence at Stroke Limiter

1:1 Gear Reduction

|  | Resolver Angle | Mode | Piston Location | Valve Status | Flywheel Effect | Linear Generator |
|---|---|---|---|---|---|---|
| Cycle A | 0 | Intake | TDC | Intake valve open | M/G provides power | Idle |
|  | 180 | Compression | BDC | Both valves closed | M/G provides power | Idle |
| Cycle B | 0 | Power | TDC | Both valves closed | M/G absorbs power | Impulse |
|  | 180 | Exhaust | BDC | Exhaust valve open | M/G provides power | Idle |

½ RPM Rotary Sequence

2:1 Gear Reduction

Figure 3A

|  | Resolver Angle | Mode | Piston Location | Valve Status | Flywheel Effect | Linear Generator |
|---|---|---|---|---|---|---|
| Cycle A | 0 | Intake | TDC | Intake valve open | M/G provides power | Idle |
|  | 90 | Compression | BDC | Both valves closed | M/G provides power | Idle |
| Cycle B | 180 | Power | TDC | Both valves closed | M/G absorbs power | Impulse |
|  | 270 | Exhaust | BDC | Exhaust valve open | M/G provides power | Idle |

Note: Intake = Down Stroke
Compression = Up Stroke
Power = Down Stroke
Exhaust = Up Stroke

Figure 3B

ADAPTIVE LINEAR LINKED PISTON ELECTRIC POWER GENERATOR

CROSS-REFERENCE TO RELATED APPLICATIONS

This application claims priority to provisional application 62/488,990, filed on Apr. 24, 2017, which is herein incorporated by reference in its entirety.

BACKGROUND OF THE INVENTION

The present invention relates to the incorporation of internal combustion engines coupled to electrical generators. More particularly to the field of linear piston electrical energy generators, which can be incorporated into hybrid vehicles or operate as a stationary electrical power generation system.

Linear piston engines in the form of free piston engines have been in existence for over 75 years. In their simplest form, they consist of an unattached piston shuttling back and forth in a cylinder assembly. On one end of the cylinder is a return or bounce spring, and on the opposing end of the cylinder is the combustion head with the fuel/air mixture acting as a spring during a compression stroke. Intake and exhaust ports would be located in the cylinder walls creating a "two-stroke" internal combustion engine. Combustion is initiated in the area where the cylinder head is attached using compression ignition. Starting this form of free piston engine was typically done using compressed air. The compressor of the fuel/air mixture at the head would act as an "air spring". When the fuel/air mixture was sufficiently compressed, the mixture would then become hot enough to ignite the mixture sending the piston back down the cylinder. The bottom spring reverses the piston direction back to the cylinder head. Once initiated and running, the endless cycle of piston shuttling becomes self-sustaining. To achieve a sufficient ignition temperature in cold weather, an electrical glow plug might be activated in the piston cylinder head to assist in heating the air mixture during compression.

Early applications of the free piston engine design were largely limited to the use in air compressors and gasifiers. This limitation of use was largely due to control issues. Once running, the fuel/air mixture would be adjusted to the mechanical load for continuous operation. Any variation of mechanical loading would interfere with the power equilibrium, thus requiring a readjustment in the fuel/air volume. The adaptation to more general applications, such as a vehicle propulsion unit, proved to be problematic due to the control problems induced by the constantly changing mechanical loading. A further limitation of a single piston free piston design is that of vibration and noise as was discovered in 1956 by General Motor's testing of the XP-500 prototype vehicle. In recent years, companies have begun to develop a Free-Piston Engine Linear Electrical Generator (FPEG) for use in hybrid vehicles utilizing an opposed piston configuration which have addressed to some extent the vibration issues.

Conventional linear piston designs suffer from several limitations. When operating as a free piston engine, some form of spring action must occur at each end of the piston travel. Failure to return the piston will result in serious damage. Free piston designs are inherently a 2 stroke design. While simpler than a 4 stroke solution, the 2 stroke (cycle) is less efficient with respect to fuel consumption and produces unacceptable exhaust emissions. Typically a 2 stroke design also requires lubrication to be mixed with the fuel. Conventional free piston engines are difficult to control power settings due to the complexities of controlling piston oscillation.

Thus, there is a need for a free piston engine design that addresses the control, vibration, and efficiency issues.

SUMMARY OF THE INVENTION

According to various embodiments, a linear piston electrical generator is disclosed. The linear piston electrical generator includes an internal combustion assembly comprising a piston housed within a cylindrical combustion chamber, a linear power generator comprising a magnet assembly surrounded by a coil assembly, a pushrod connected to the internal combustion assembly and the linear power generator, a limiter rod connected to the pushrod to control end limits for a position of the piston, and a rotation disk connected to the limiter rod.

According to various embodiments, a piston linear electrical generator is disclosed. The piston linear electrical generator includes a first internal combustion assembly and a first linear power generator; a second internal combustion assembly and a second linear power generator; and a stroke limiter connected to the first internal combustion assembly, first linear power generator, second internal combustion assembly, and second linear power generator. The stroke limiter includes a first pushrod connected between the first internal combustion assembly and the first linear power generator, a second pushrod connected between the second internal combustion assembly and the second linear power generator, a first limiter rod connected to the first pushrod, a second limiter rod connected to the second pushrod, a first rotation disk connected to the first limiter rod, and a second rotation disk connected to the second limiter rod. The movement of the first pushrod associated with the first internal combustion assembly and the first linear power generator and the movement of the second pushrod associated with the second internal combustion assembly and the second linear power generator are oppositely phased.

According to various embodiments, a linear piston electrical generator arrangement is disclosed. The arrangement includes a plurality of 2-piston linear electrical generators coupleable in series, a buck/boost converter coupled to one of the 2-piston linear electrical generators, a DC link coupled to the buck/boost converter, and a controller to determine the operational state for each 2-piston linear electrical generator.

According to various embodiments, a hybrid electric vehicle is disclosed. The hybrid electric vehicle includes an energy storage device, a traction drive coupled to the energy storage device, the traction drive comprising a traction motor, and a plurality of 2-piston linear electrical generators coupled to the energy storage device.

According to various embodiments, a piston linear electrical generator is disclosed. The piston linear electrical generator includes a first internal combustion assembly and a first linear power generator, a second internal combustion assembly and a second linear power generator, and a stroke limiter connected to the first internal combustion assembly, first linear power generator, second internal combustion assembly, and second linear power generator. The stroke limiter includes a first pushrod connected between the first internal combustion assembly and the first linear power generator, and a second pushrod connected between the second internal combustion assembly and the second linear power generator. The movement of the first pushrod associated with the first internal combustion assembly and the first linear power generator and the movement of the second pushrod associated with the second internal combustion assembly and the second linear power generator are oppositely phased.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 3A is a table illustrating the operation of the single piston stroke limiter when operating as a 4-cycle internal combustion engine according to an embodiment of the present invention;

FIG. 3B is a table illustrating operation of a 2-piston linear electric generator when operating as a 4-cycle internal combustion engine according to an embodiment of the present invention;

DETAILED DESCRIPTION OF THE INVENTION

The disclosed invention is an apparatus intended to be a key element of a hybrid electrical power system. The hybrid power system may be utilized as a stationary (non-moving) application or a hybrid vehicle. The hybrid system will include 1 or more power modules consisting of a unified power generation system and incorporating an internal combustion assembly for each power module. The unified power system includes a supervising processor for managing each individual power module. The power modules may be selected to turn on or off. When turned on the module will be commanded to produce a specified power amount by the supervising processor.

Figure 1:
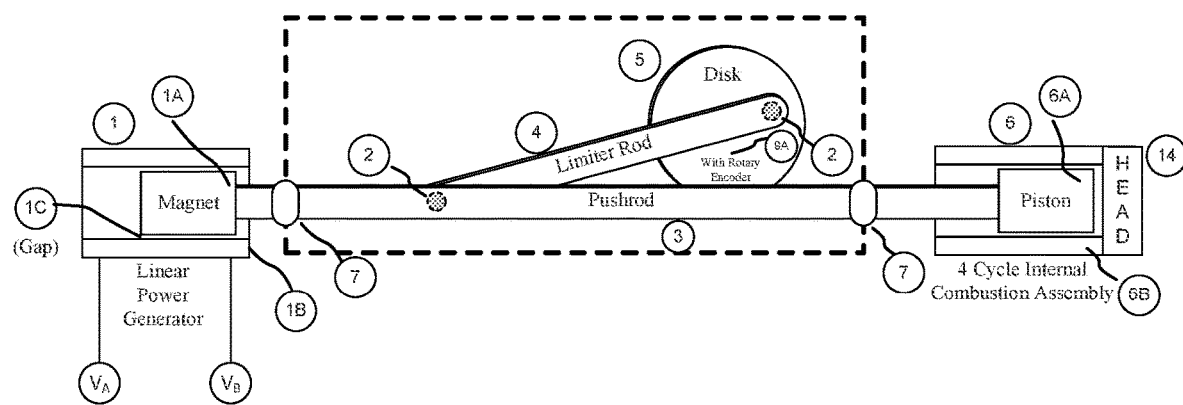
FIG. 1 is a schematic diagram of a single piston stroke limiter for a linear electrical power generator according to an embodiment of the present invention.

FIG. 1 represents, with a cross sectional view, a single linked piston electrical generator including a linear power generator (1) according to an embodiment of the present invention. The linear power generator (1) includes a permanent magnet assembly (1A) that will mechanically oscillate back and forth in a linear motion located in a cylinder surrounded by a pickup coil (1B).

The motion of the magnet (1A) induces a bipolar voltage ($V_A$, $V_B$) in the coil (1B). The magnet (1A) is connected to an internal combustion assembly (6) by way of a pushrod (3). The pushrod (3) is attached to the magnet (1A) in the linear power generator (1) and a piston (6A) in the internal combustion assembly (6). Both the magnet (1A) and piston (6A) move in an oscillatory manner in unison. The pushrod (3) is supported and guided by multiple linearly arranged bearings (7). There is a small gap (1C) between the magnet (1A) and a cylinder wall of the linear power generator (1). The gap (1C) insures that no frictional losses occur within the linear power generator (1).

The magnet (1A) is encapsulated by a linear coil assembly (1B) with a hollow center, permitting the magnet (1A) to move within the coil assembly (1B). The surface of the magnet (1A) comes close but does not touch the inner walls of the linear coil (1B). The smaller the gap between the magnet (1A) and the inner wall of the linear coil (1B), the better the flux coupling will be between the magnetic field of the magnet (1A) and the linear coil (1B). As the magnet (1A) moves back and forth it will induce an electromotive force (EMF) in the linear coil (1B). The magnitude of the EMF voltage is proportional to the rate at which the magnet (1A) moves. The voltage produced by the linear coil (1B) will appear between terminals $V_A$ and $V_B$. The waveform produced at terminals $V_A$ and $V_B$ will be sinusoidal in nature with a frequency dependent on the oscillation rate of the piston (6A) moving in the cylinder.

The internal combustion assembly (6) is shown in a simplified form for purposes of clarity. Not shown are the lubrication system, air/fuel intake, exhaust ports (or alternatively valves), and ignition system. These are well known elements of an internal combustion type engine. Piston rings (not shown) surround the piston, are in direct contact with the piston cylinder wall, and provide a seal for a combustion chamber (6B).

The combustion engine cylinder may be coated with a friction material such as a tungsten-molybdenum disulfide polymer matrix coating or a high temperature Teflon. A low viscosity lubrication oil such as 10w-30 may be used to reduce piston friction, and therefore reduce energy loss as well as reducing mechanical wear on the engine parts. The design of the combustion engine assembly will depend on the cycle type (i.e. 2 or 4 cycle, Otto, or diesel) and will dictate the friction reduction methods employed.

Key to operation of the internal combustion unit (6) is a limiter rod (4) and a rotation disk (5). The limiter rod (4) is mechanically coupled to the pushrod (3) via a crankpin (2). The limiter rod (4) is also mechanically coupled to the rotation disk (5) via a crankpin (2). The limiter rod (4)

controls the end limits for the position of the internal combustion piston (6A). The limiter rod (4) operating in concert with the pushrod (3) and the disk (5) define both top-dead-center (TDC) and bottom-dead-center (BDC) limits on the combustion piston (6A). The use of the limiter rod (4) and disk (5) is a feature that distinguishes the linked piston design from conventional linear piston designs.

The crank pin (2) mounted on the rotation disk (5) defines the overall stroke limit of the internal combustion piston (6A). The distance from the center of the disk (5) to the center of the crank pin (2) is defined as R (Radius). The piston maximum stroke length is 2*R and equal to the linear distance from TDC to BDC.

The disk (5) is connected by a gear pair with a 1:1 ratio. The first gear is attached to the disk (5). The second gear is attached to a rotary position resolver or rotary encoder (9A). The two gears mesh to form the 1:1 turning ratio. The resolver (9A) will produce a digitally encoded signal indicating the shaft angle of the resolver.

The disk (5) serves another important purpose: the internal combustion assembly (6) produces energy (and therefore power) as a series of controlled explosions or energy impulses. The disk (5) provides a "smoothing function" or integration function to absorb and release the energy impulses produced by the ignition process and acts as a flywheel.

To thus overcome the limitations of conventional linear pistons, a mechanism to limit the piston stroke excursion is introduced. The piston (6A) and magnet (1A) are connected by a pushrod (3) resulting in a linear bidirectional motion. The end limit of travel is determined by the limiter rod (4) and rotation disk (5).

As indicated above, the piston (6A) and piston cylinder (6) are elements of an internal combustion engine (ICE). A piston head (14) contains a valve assembly, including an intake valve and exhaust valve, and a spark igniter. An ICE controller sequences the intake and exhaust valve motion in concert with the spark igniter to induce a reciprocating motion of the piston. These elements will be discussed in more detail below, with reference to FIG. 5. The ICE controller adjusts the timing and sequence of the head valves and ignitor using positional information from the rotary encoder (9A). It should be noted that a linear position encoder connected to the pushrod (3) can be used as an alternative to the rotary encoder (9A).

Connected to the head (14) is a carburetor subassembly to mix fuel and air to produce a combustion mixture to be drawn into the piston cylinder (6B) for a controlled burn to extract the potential chemical energy contained in the fuel mixture. Carburation is best performed by a fuel injector, to be shown in more detail in FIG. 5, but may alternatively be performed with a carburetor using a venturi effect drawing air in during an intake stroke of the piston (6A).

Figure 2A:
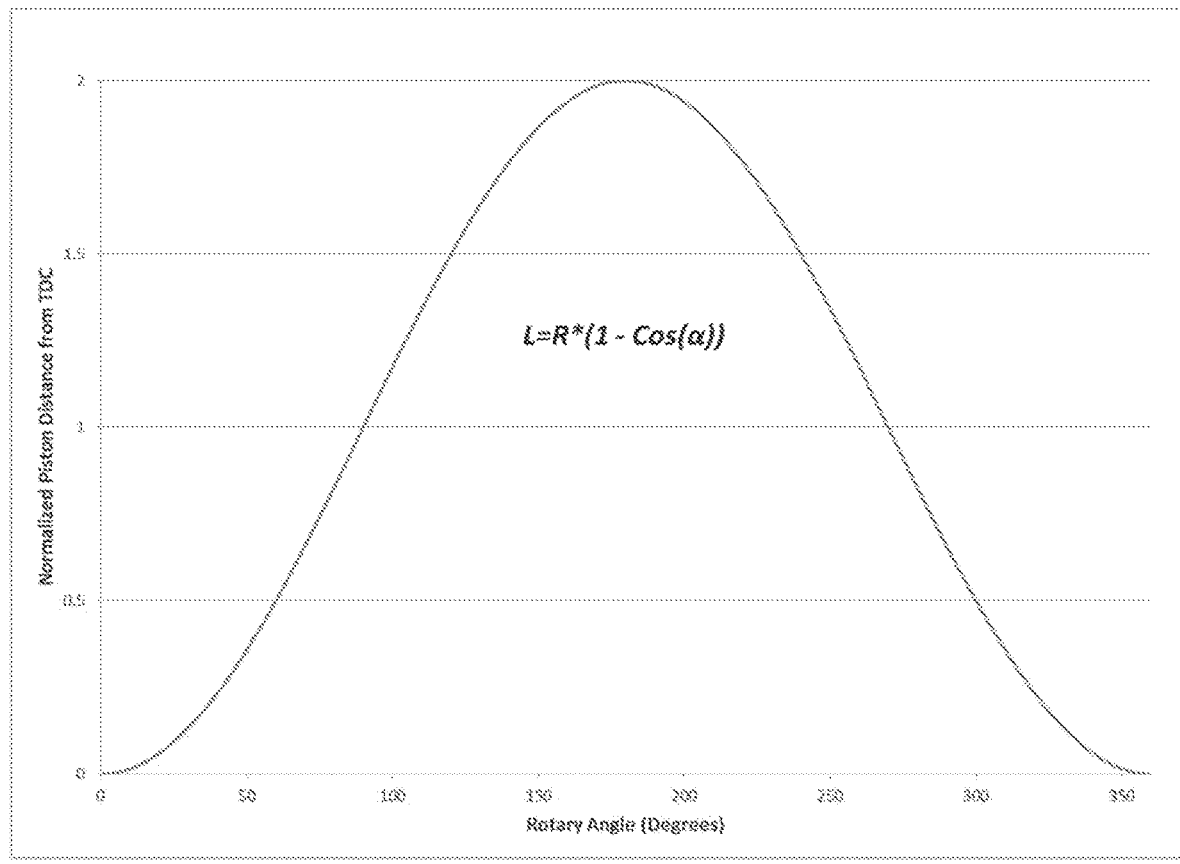
FIG. 2A is a graph illustrating a linear piston electrical generator (LPEG) piston position versus resolver angle according to an embodiment of the present invention.

FIG. 2A is a graph of the stroke length as a function of encoder rotation angle. The stroke length of the piston and magnet assembly (1A) in the linear power generator (1) determines the oscillation frequency of the magnet/piston pair. The power generated per stroke is determined by the geometry of the piston cylinder and the linear coil (1B) in the power generator (1). Stroke length limits are determined by the diameter of the disk (5) and the length of the limiter rod (4). As can be seen in FIG. 2, stroke position as a function of resolve angle is a repeating sinusoid. With the piston (6A) at TDC, the angle of the resolver shaft will be 0 degrees. When the resolver (9A) output is indicating 180 degrees, the piston (6A) will be at BDC.

A key limitation for conventional designs is the restriction of a 2-stroke cycle of the internal combustion process. A 2-stroke cycle has an inherent problem with the production of air pollution in its exhaust and is less efficient than the more complicated 4-stroke cycle. The introduction of the stoke limiter, which includes the pushrod (3), the limiter rod (4), and the disk (5), permits the introduction of an efficient 4-cycle internal combustion design.

FIG. 3A is a table identifying the 4-cycle sequence for the mechanical elements of FIG. 1. Cycle A consists of the piston (6A) starting at TDC, with the intake valve open. The piston (6A) will move away from the cylinder head (14) drawing in a fuel mixture via the intake valve. This is the intake cycle. Once the piston (6A) reaches BDC the intake valve closes and the piston reverses direction to start the compression cycle. With both intake and exhaust valves closed, and with the piston (6A) moving to TDC the compression cycle occurs.

During cycle A, in FIG. 3A, a motor/generator provides torque to the rotation disk (5) (the motor/generator acts as an "active" flywheel) which in turn transfers a force to the pushrod (3) by way of the limiter rod (4) to induce linear motion to the piston/magnet pair. The motor/generator motoring action in cycle A provides force to move the piston (6A) down during the intake cycle and the compression cycle.

Once the piston (6A) reaches TDC during the compression cycle, cycle B commences with the power cycle, where an ignition spark ignites the fuel mixture. The controlled explosion forces the piston (6A) to BDC and completes the power cycle. Once reaching BDC the exhaust valve opens and the piston (6A) reverses direction towards TDC to push the exhaust fumes out of the cylinder exhaust gas (exhaust cycle) completing cycle B.

During cycle B the motor/generator unit will absorb power on the power cycle and provide power to complete the exhaust stroke. It can be seen from FIG. 3A that the power transfer to the linear generator only occurs on the power cycle.

The 4-cycle sequence may also be described as follows. Cycle 1 draws the air/fuel mixture into the piston cylinder (6) when the piston (6A) is at top dead center (TDC) (closest) to the cylinder head (14). The piston will move away from the cylinder head (14) creating a partial vacuum and drawing in the fuel/air mixture into the cylinder (6). When the piston (6A) reaches bottom dead center (BDC) the first cycle will be complete. It should be noted that both TDC and BDC are specified by the limiter rod (3) and the disk (5)/rotary encoder (9A) assembly. Cycle 2 includes closing the intake valve in the cylinder head (14) and the piston (6A) moving from bottom dead center to top dead center compressing the fuel/air mixture. Cycle 2 may be referred to as the compression cycle. Cycle 3 starts when the piston (6A) reaches TDC during cycle 2. The igniter ignites the fuel/air mixture to create a controlled burn (or explosion) forcing the piston (6A) away from the cylinder head (14). The energy released by the controlled burn is coupled to the magnet (1A) by way of the pushrod (3). Cycle 4 starts when the piston (6A) reaches BDC during cycle 3. The piston (6A) will move toward the piston head (14) with the exhaust valve open, expelling the hot exhaust from the cylinder (6).

A limitation of the invention in FIG. 1 is that some mechanism must keep track of cycle A and cycle B to complete the full 4 cycle's sequence. Software, for example, could keep track of the cycle A completion and leading to cycle B start. A further limitation to the invention in FIG. 1 is that the mechanical motion of the piston magnet pair is unbalanced, producing a vibration from the simple harmonic motion of the piston/magnet pair.

FIG. 3A also shows the 4-stroke sequence from the perspective of the rotary encoder (9A). The rotary encoder (9A) is coupled to the disk (5) using a gear or belt mechanism. The gearing ratio is 2 to 1 whereby the rotary encoder (9A) turns at half the rate of the disk (5). By reducing the angular rate of the rotary encoder (9A) with respect to the disk (5), the 4 cycle sequence of the ICE can be represented in a single rotation of the rotary encoder (9A).

The challenge in making a 4-cycle ICE operate is that the intake, compression, and exhaust cycles require energy to keep the piston (6A) (pushrod (3)) in motion. With sufficient mass, the disk (5) can both store and release mechanical energy. Such a disk (5) is commonly referred to as a flywheel. The amount of mass in the flywheel will determine the amount of energy that can be stored in the flywheel as a function of RPM.

The inertial mass of the flywheel will also determine how quickly a rotation rate change of the flywheel can occur. The more mass there is, the slower a rate change can occur. Conversely, the higher the mass, the smoother the operation of the ICE will be. The flywheel may be considered a low pass filter whereby the power impulses of the ICE are integrated to provide a smoother operation of the ICE. The flywheel is considered to be a passive energy storage device.

As previously noted, the linear power generator (1) is connected to the ICE piston (6A) by way of the pushrod (3). As the piston (6A) moves back and forth in the ICE cylinder (6), the magnet (1A) moves in concert with it. The magnet (1A) is preferably made of a neodymium formulation producing a high gauss magnetic field. Other formulations may be used such as nickel-cobalt but will produce a lower magnetic flux density.

Figure 4:
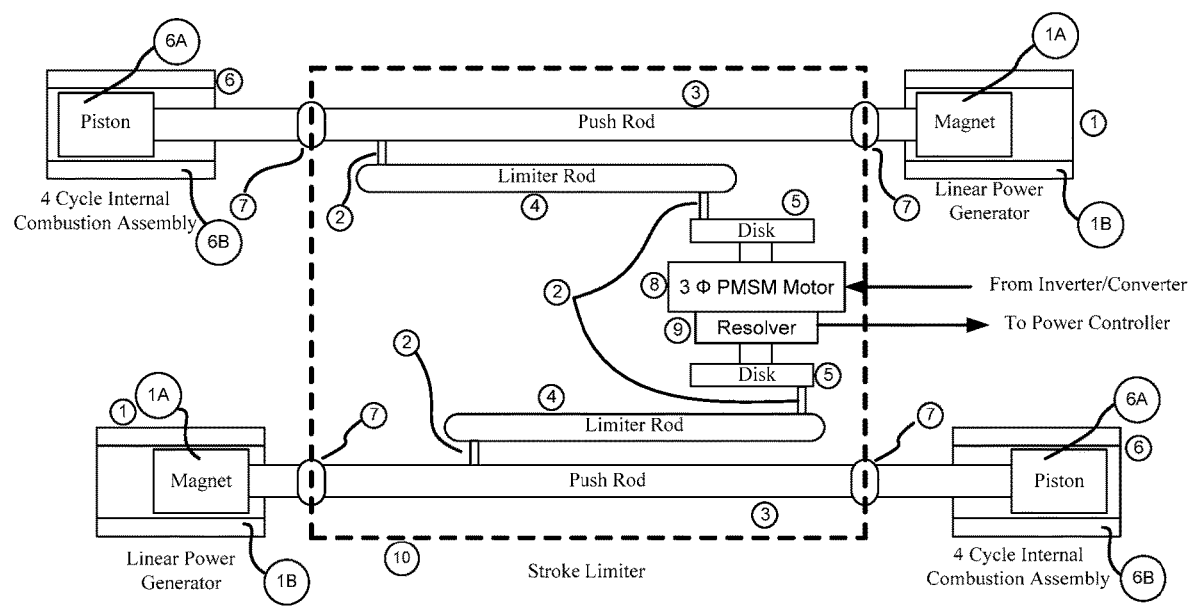
FIG. 4 is a schematic diagram of a 2-piston linear electric generator with stroke limiters and a permanent magnet synchronous motor (PMSM) according to an embodiment of the present invention.

FIG. 4 is a schematic diagram for an enhanced embodiment of the invention that was illustrated in FIG. 1. FIG. 4 shows a "Dual Power Module" with 2 ICEs (6) and 2 power generators (1) mechanically coupled to a stroke limiter (10) including 2 disks (5), a permanent magnet synchronous motor (PMSM) (8), and a resolver (9). The ICE/power generators (6)/(1) are phased so that they move in opposite directions when operated. The opposing motion results in force cancelation, minimizing operational vibration. The stroke limiter (10) provides for 3 functions. It insures that the ICE/power generators (6)/(1) move in opposite directions, provides accurate position information from the resolver (9), and acts as an active flywheel. The active flywheel function uses the PMSM (8) to absorb energy when either piston is performing a power stroke and provides energy on a compression, exhaust, or intake stroke. A key difference between the stroke limiter device in FIG. 1 when compared to the stroke limiter (10) in FIG. 4 is the 2:1 gear ratio. The 2:1 gear ratio permits all 4 cycles of both pistons to be tracked with a single rotation of the resolver shaft.

FIG. 3B is a table showing the operation of the invention found in FIG. 4. As shown by FIGS. 3A and 3B, the 4 cycles are the same with the difference found in FIG. 3B where all 4 cycles occur in a single rotation of the rotary encoder. This is due to the 2:1 gear between the limiter disk (5) and the rotary encoder (9A).

Figure 2B:
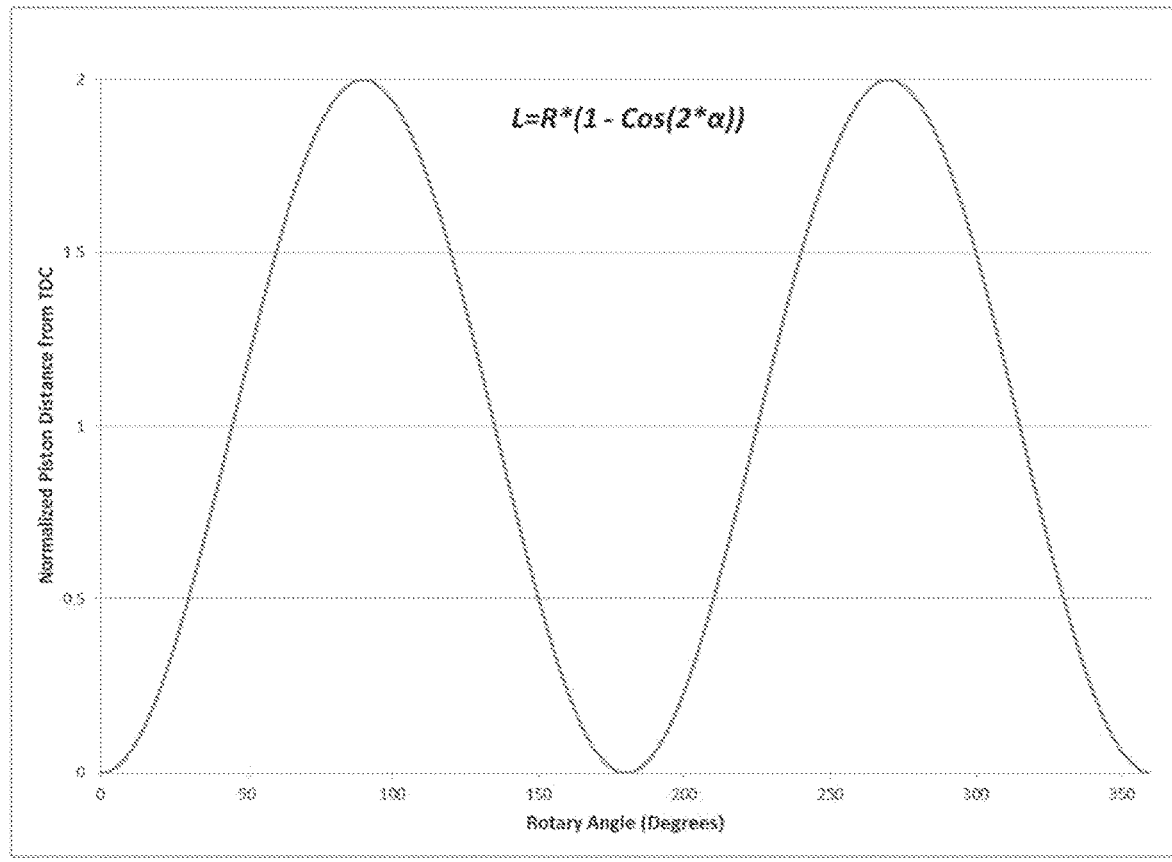
FIG. 2B is a graph illustrating a LPEG piston position versus resolver angle according to another embodiment of the present invention.

FIG. 2B shows the relationship of both piston/magnet pairs found in FIG. 4. At 0 degrees both pistons will be at TDC on cycle A. At 90 degrees the pistons will be at BDC of cycle A. At 180 degrees the pistons will be at TDC cycle B. At 270 degrees the pistons will be at BDC on cycle B. Finally, at 0 degrees the 4 cycle sequence will start over.

Figure 5:
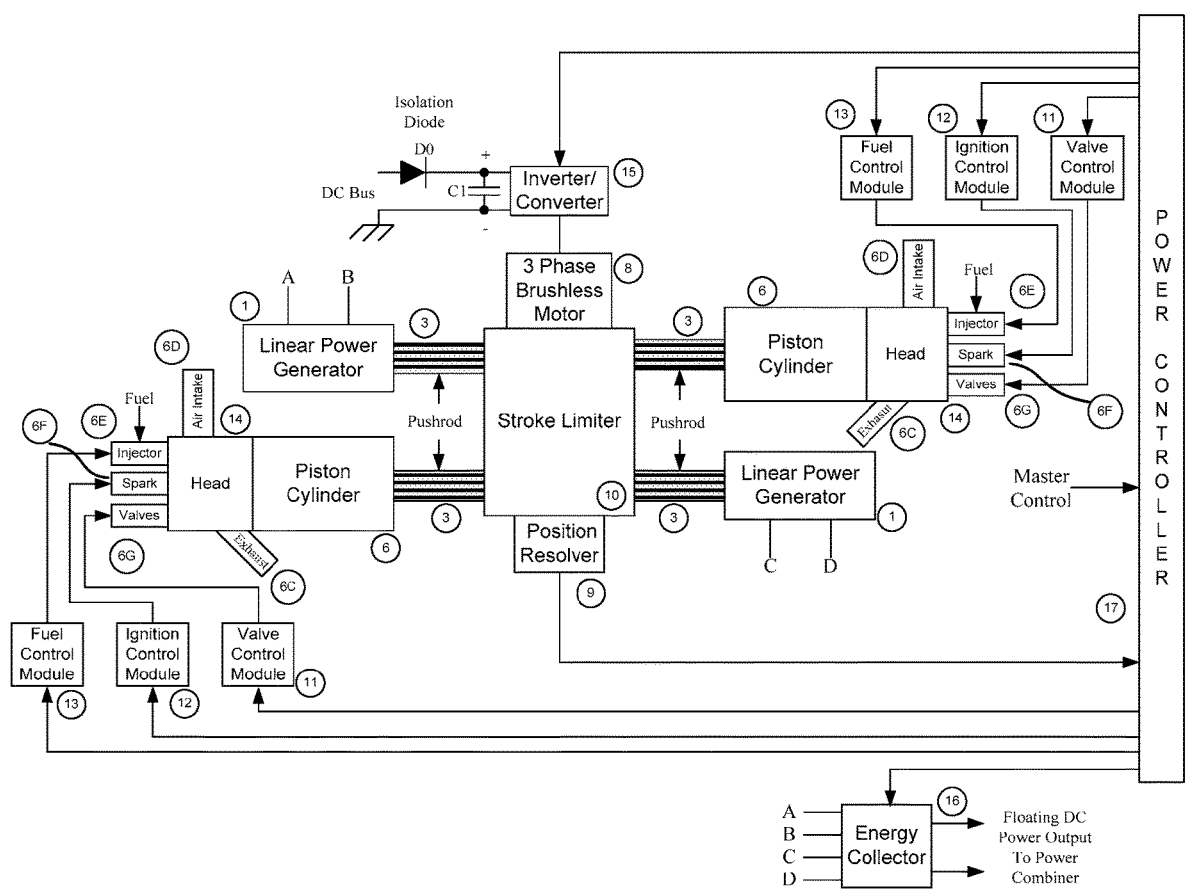
FIG. 5 is a schematic diagram of a 2-piston LPEG combined cylinder and linear power generator according to an embodiment of the present invention.

FIG. 5 is a schematic diagram providing further detail with respect to the embodiment found in FIG. 4. Fuel control modules (13) control the fuel injector (6E) using pulse width modulation to mix fuel with the intake air (6D). Ignition control modules (12) provide high voltage energy to the spark plug (6F). Valve control modules (11) electrically activate the intake valve (6G) and exhaust valve (6C). The fuel control modules (13), ignition control modules (12), and valve control modules (11) obtain sequencing signals from a power controller (17). The power controller (17) monitors position information from the piston resolver (9). An inverter/converter assembly (15) provides power control to the PMSM (8), which is a 3 phase brushless motor and acts as an active flywheel. Capacitor C1 provides and receives electrical energy depending on the mode of operation of the 3 phase PMSM (8). When the motor (8) is in regeneration (absorbing energy), capacitor C1 is charged. When the motor (8) is producing mechanical power, capacitor C1 discharges. Capacitor C1 is also supplied with supplemental energy from a DC bus external to the linear electrical power generator. Diode D0 is an isolation diode that keeps energy from coming back to the power supply. The supplemental energy is used for ICE starting and provides additional energy during the intake, compression, and exhaust cycles of the ICE units. The energy collector (16), to be further detailed in FIG. 9, collects electrical energy from the 2 linear power generators (1) and provides the collected energy to an power combiner external to the linear electrical power generator.

Figure 6:
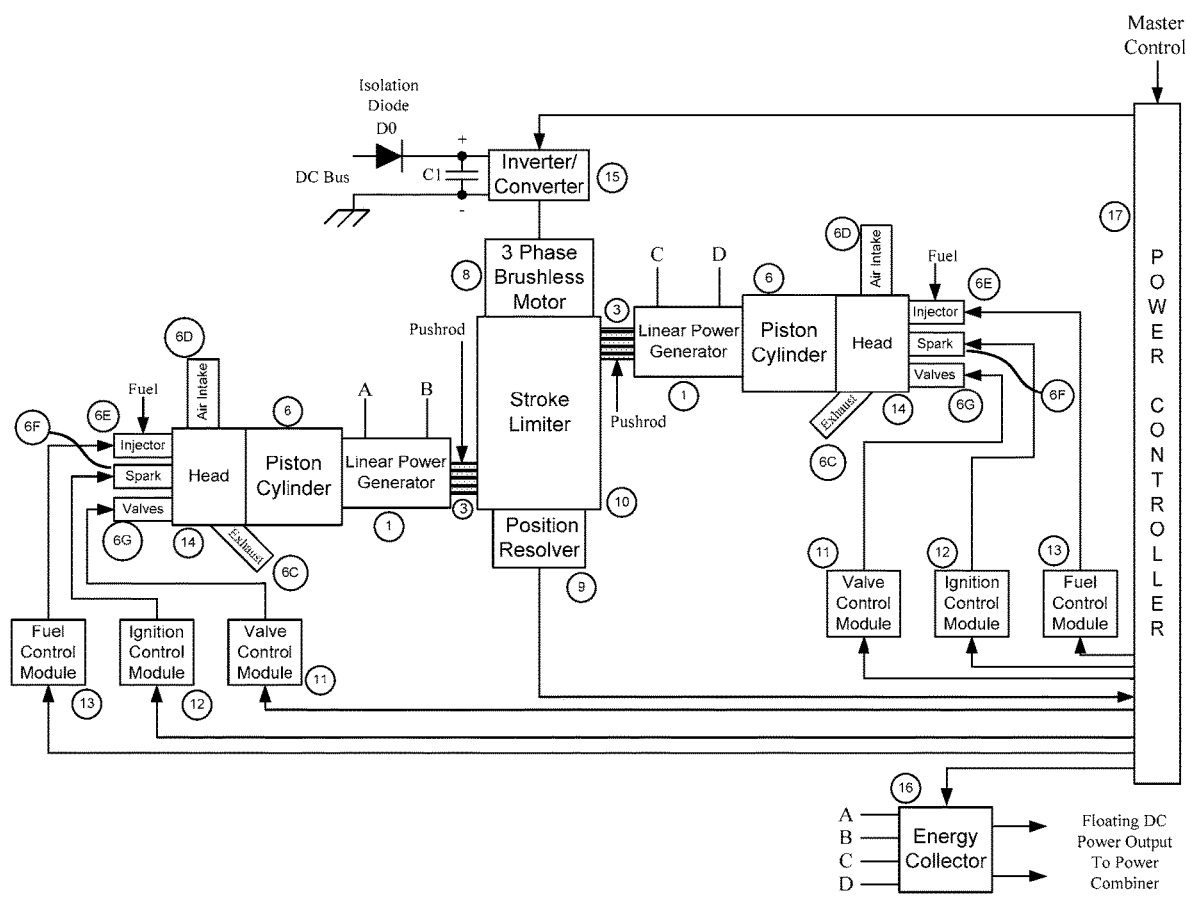
FIG. 6 is a schematic diagram of a 2-piston LPEG combined cylinder and linear power generator according to an alternative embodiment of the present invention.

FIG. 6 illustrates an enhancement to the embodiment shown in FIG. 5. The linear power generators (1) have been relocated such that they are coupled to the piston cylinder assemblies (6) as opposed to the opposing side of the stroke limiter (10). This configuration provides for a more compact mechanical design.

Figure 7:
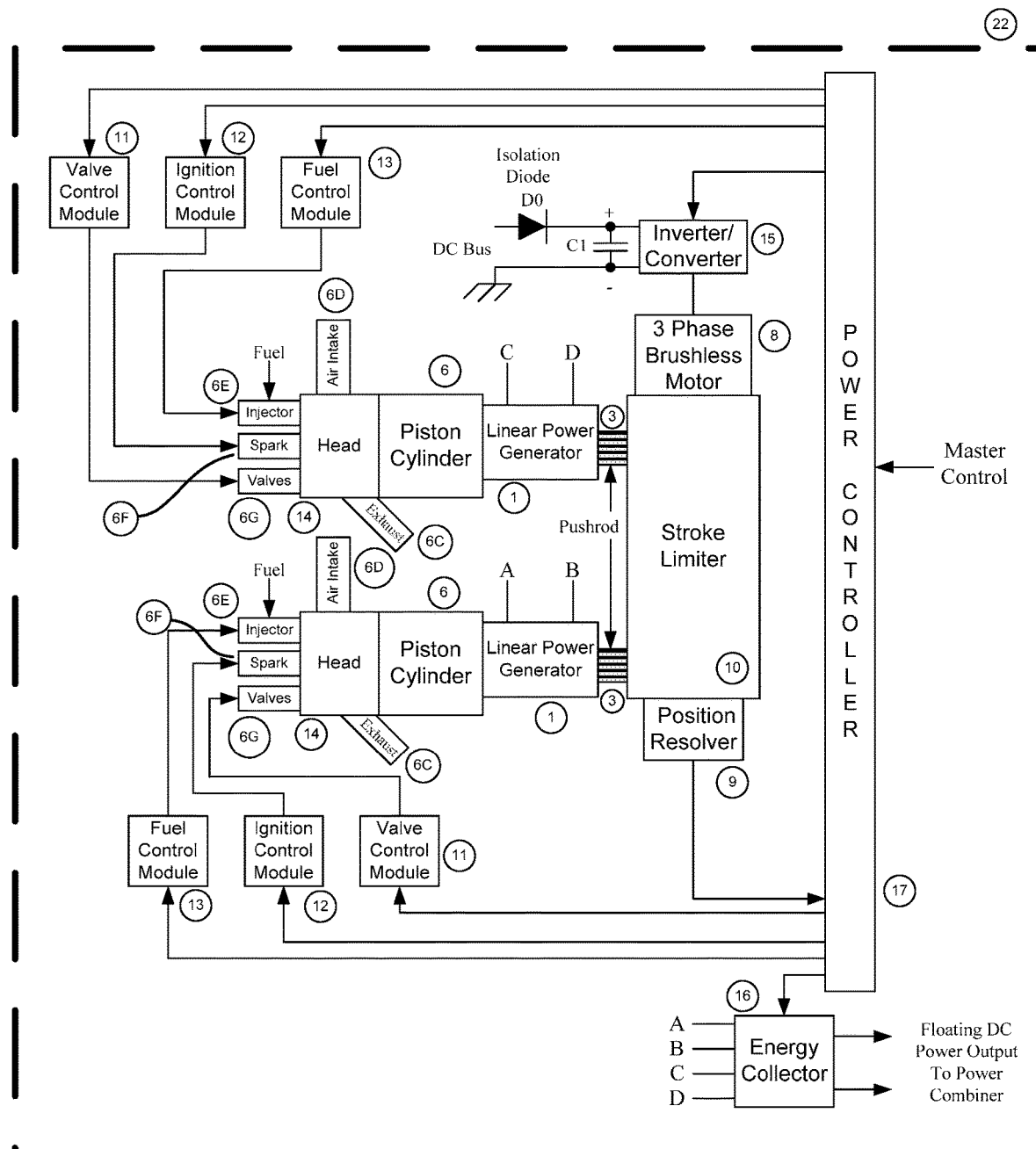
FIG. 7 is a schematic diagram of a 2-piston LPEG combined cylinder and linear power generator according to another alternative embodiment of the present invention.

FIG. 7 illustrates a further compaction of the invention found in FIG. 6. As shown in FIG. 7, both ICE/linear power generator pairs (6)/(1) are located on the same physical side of the stroke limiter (10).

Figure 8:
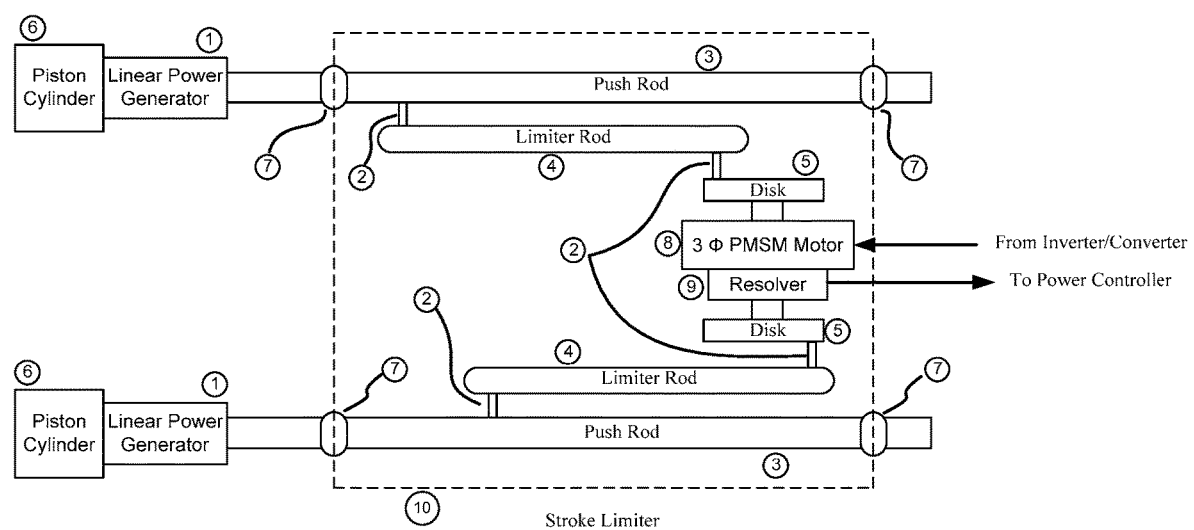
FIG. 8 is a schematic diagram of a 2-piston LPEG stroke limiter according to an embodiment of the present invention.

FIG. 8 provides further details of the mechanical elements found within the stroke limiter (10) as shown in FIG. 7. It should be noted that the ICE/power generators (6)/(1) are phased in opposing directions consistent with the previous embodiments as found in FIGS. 4-7.

Figure 9:
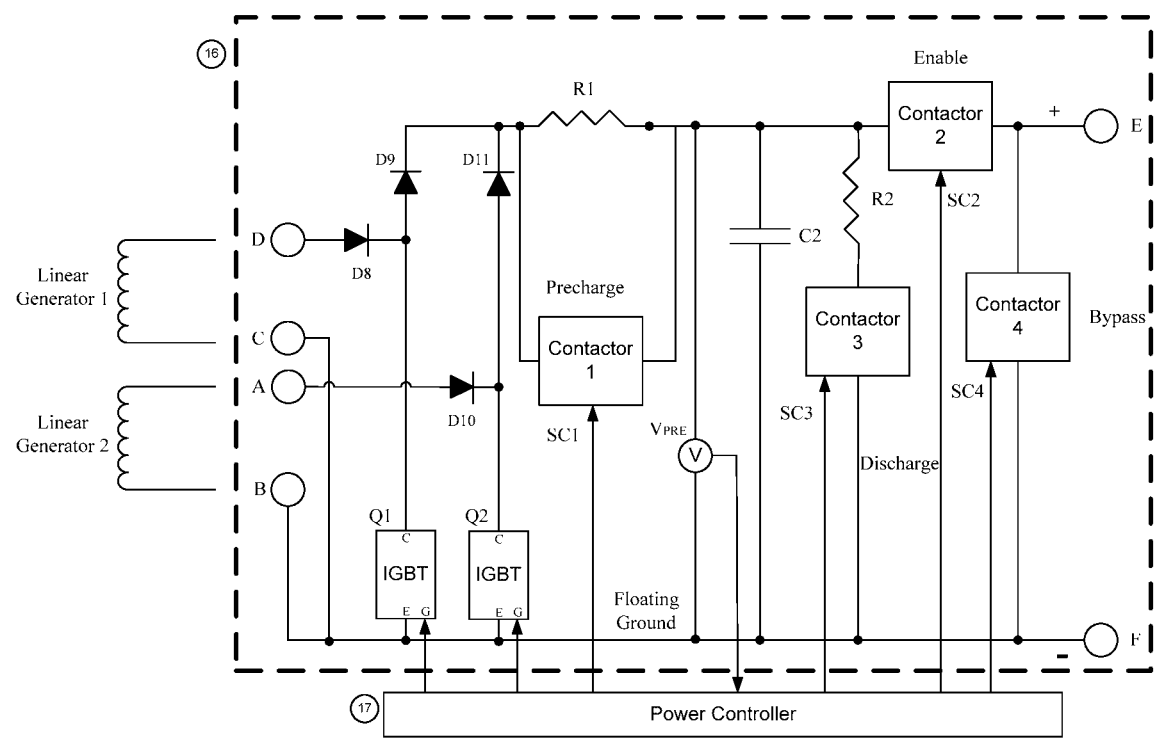
FIG. 9 is a schematic diagram of a 2-cylinder energy collector module according to an embodiment of the present invention.

FIG. 9 is a schematic diagram for the electrical energy collector module (16). Within each 2-piston power generator are 2 linear coil electrical power generators. Each linear coil produces electrical voltage that is bipolar. Energy is primarily collected during the power stroke of each cylinder.

In an off line state the Enable Contactor SC2 is open and the Bypass Contactor SC4 is closed. The contactors discussed herein may be any solid state switching devices, but mechanical switching devices are preferred for safety reasons.

To sequence the 2 cylinder energy collector on line the following sequence occurs:

The 2 cylinder energy collector module (16) collects energy from the two linear generators (1). As the energy from each linear generator (1) has both a positive and negative voltage component, diodes D8 and D10 couple electrical energy into the collector module only passing the positive component from each generator (1). To boost the voltage the Q1 and Q2 IGBTs are turned on and off during the proper portion of the energy generation stroke to inductively boost the generated voltage. Q1 and Q2 may be any kind of semi-conductor switching device, but IGBTs are preferred. The inductive element includes the linear generator coils (1B), as shown in FIGS. 1 and 4. A 50% duty cycle on the IGBT gate input will provide for a voltage boost of 2:1.

The combination of Q1 and diode D9, and the combination of Q2 and diode D11 creates two individual inductive boost circuits when combined with its respective linear generator coil. This boosted voltage charges capacitor C2 through a pre-charge resistor R1 to bring up the voltage on C2 without causing excessive currents. Once the voltage ($V_{PRE}$) at the capacitor C2 indicates the capacitor C2 is charged, a Pre-Charge Contactor SC1 is closed, bypassing the pre-charge resister R1 so full power can be used from the boost circuit.

The power controller (17) controls the pulse width modulation supplied to IGBTs Q1 and Q2 to create the required level of boost to maintain the voltage ($V_{PRE}$) at the desired voltage. The Pre-Charge Contactor SC1 is controlled by the power controller (17) based on reading the voltage ($V_{PRE}$) to bypass the pre-charge resistor R1.

To enable the 2 cylinder energy collector (16) into service, the Enable Contactor SC2 is closed and the Bypass Contactor SC4 is open.

To remove the 2 cylinder energy collector (16) from operation, it must be sequenced to a quiescent state under control of the power controller (17). Boosting functions are discontinued and the Pre-Charge Contactor SC1 is open. A Discharge Contactor SC3 is closed to bleed off capacitor C2 through a discharge resistor R2. The Enable Contactor SC2 is open and the Bypass Contactor SC4 is closed to bypass the 2 cylinder energy collector (16).

Figure 10:
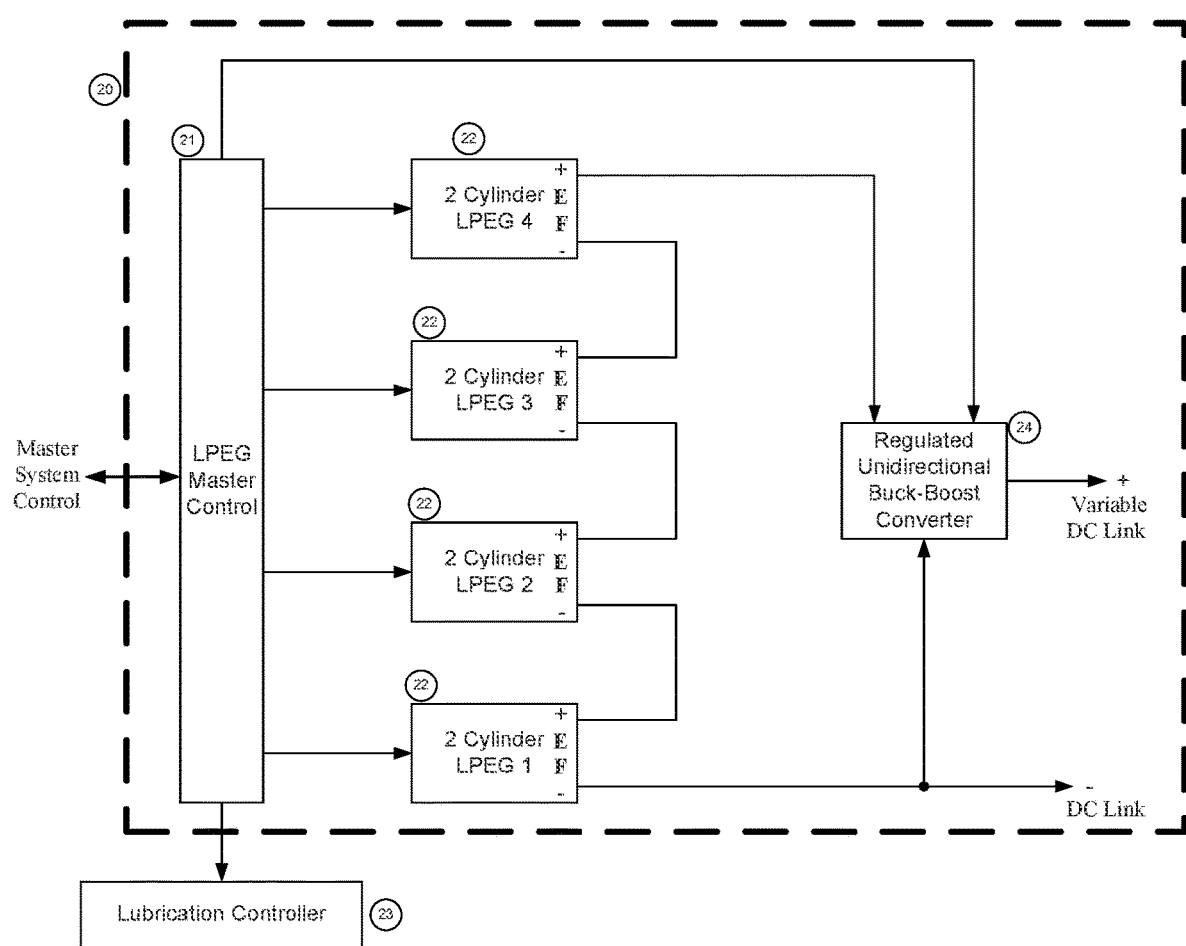
FIG. 10 is a schematic diagram of a quad LPEG unit with a power combiner according to an embodiment of the present invention.

FIG. 10 is a schematic diagram of a power combiner (20) embodiment with four identical power modules (22) in a "Quad Unit" LPEG arrangement that are independently controlled and respective powers are selectively combined. While four power modules are used in this embodiment, it should be understood that other pluralities may be used. Each power module (22) is of the configuration as found in FIG. 7. The power combiner (20) also incorporates the lubrication system found in FIG. 11, to be discussed in more detail below. The master control (21) determines the operational state for each power module (22). By example, if each power module (22) is capable of producing 10kW, the overall power generation is 0 to 40 kW (minus losses). The function of the individual energy collector modules (16) within the power modules (22) permits the power modules (22) to be electrically connected in series. The additive voltage aspect produces a large dynamic range of voltage and power. It is preferable to electrically connect the power modules (22) in series, but it is also possible to connect them in parallel. The bypass contactor SC4 in each energy module (16) permits 16 possible combinations of the 4 power modules (22). A software scheduling method may keep track of individual power module activity and allow for a nearly equal distribution of use, thereby simplifying maintenance scheduling. It is also possible to take one or more power modules (22) "offline" due to a fault and allow the remaining modules (22) to meet the power demands.

The regulated unidirectional buck-boost converter (24) adapts the power and voltage of the power module stack to the target demands of the variable DC link. The DC link may be used to charge an external high voltage battery, provide power to a motor inverter, or to a fixed frequency DC to AC inverter. The buck-boost converter (24) also compensates and minimizes the DC ripple inherently produced by the power modules (22).

Figure 11:
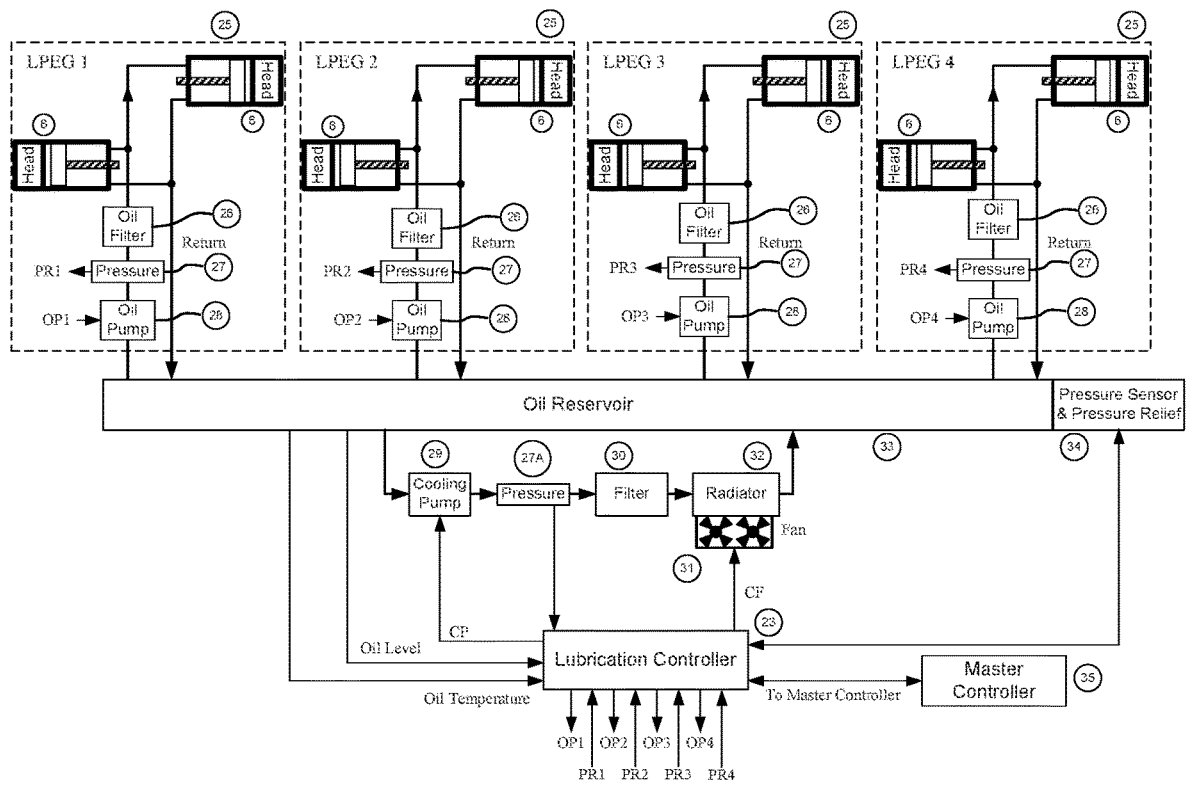
FIG. 11 is a schematic diagram of a quad LPEG unit lubrication system according to an embodiment of the present invention.

FIG. 11 is a schematic diagram showing details of a Quad Unit LPEG lubrication system. The dual power module mechanics require lubrication to all the moving parts. As each power module (25) operates independently, its oil circulation is designed to function independently. The independent operation has several advantages over a unified oil circulation system. Each power module (25) can be active or inactive without affecting the other power modules (25). The failure of a power module (25) will not interfere with the operation of the remaining power modules (25). Oil pressure (27) is available for each power module (25), allowing for decisions to determine if the unit is fit for operation. A common oil reservoir (33) contains the oil for the four power modules (25). The oil pump (28) draws oil from the reservoir (33). The oil pump (28) is activated by the lubrication controller (23). Oil is pumped through an oil filter (26) to feed the piston assemblies (6). The oil continues its path through the piston assemblies (6) and is returned to the oil reservoir (33). An oil pressure sensor (27) is located between the output of the oil pump (28) and the input of the oil filter (26) and is monitored by the lubrication controller (23). The lubrication controller (23) makes decisions based on commands from the master controller (35) and the oil pressure sensors (27) to control the oil pumps (28) in the power modules (25).

The oil reservoir (33) is monitored for oil level, oil temperature, and oil pressure. An oil level low indication is passed from the lubrication controller (23) to the master controller (35) should the oil level fall below operating parameters. Another pressure sensor (34) is read by the lubrication controller (23) to determine if the oil reservoir requires pressure equalization by opening a pressure relief valve. The temperature of the contents of the oil reservoir (33) is controlled by the lubrication controller (23). Based on predetermined temperature thresholds, a cooling pump (29) is activated by the lubrication controller (23) pumping the oil through an oil filter (30), then through a radiator (32), and back into the oil reservoir (33). Additionally, the lubrication controller (23) operates a fan (31) to force airflow through the radiator (32) to assist in cooling. A pressure sensor (27A) is monitored to assess the condition of the oil cooling path.

Figure 12:
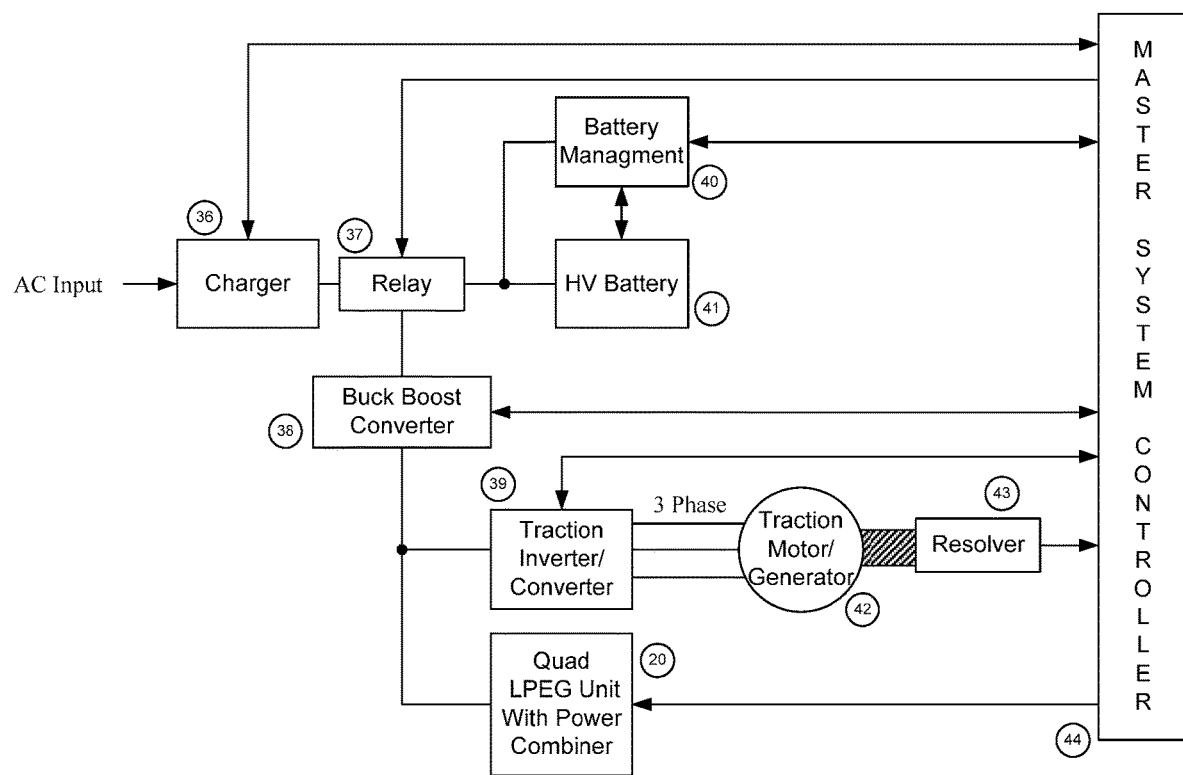
FIG. 12 is a schematic diagram of a hybrid vehicle incorporating a quad LPEG unit according to an embodiment of the present invention.

FIG. 12 is a schematic diagram of a hybrid vehicle incorporating a quad power module unit with power converter as shown in FIG. 10, which creates a scalable system for generating power to charge a high voltage (HV) battery and run the traction motor.

As a plug-in hybrid, an AC plug charger (36) is connected an HV battery (41) through a relay (37). A battery management system (40) controls the charging of the HV battery (41) in conjunction with a master system controller (44) and the charger (36).

In the hybrid mode, the relay (37) connects the HV battery (41) to a buck/boost converter (38). Based on a call for torque, the master system controller (44) instructs the buck/ boost converter (38) in conjunction with a traction inverter/ converter assembly (39) to run the traction motor/generator (42) at the requested speed. The speed and direction is determined by reading a resolver (43). During braking, the traction motor/generator (42) generates power to charge the HV battery (41) through the traction inverter/converter assembly (39) and the buck/boost converter (38).

As the demand for power goes up or the state of charge of the HV battery (41) goes down a quad power module unit with power combiner (20) is called by the master system controller (44) to supply additional power. The power generated can be used to charge the HV battery (41), run the traction motor/generator (42), or both. As the quad power module unit with power combiner (20) is made up of four complete LPEG generators, as shown in FIG. 10, the amount of power generated can be controlled by the number of units called into service. Based on the need, any combination of the four LPEG Generator units can be called into service.

As such, disclosed herein is a load adaptive linear electrical generator system for generating DC electrical power. The DC power may be transformed to AC with a single or multiple phase electrical inverter. The electrical generation system includes 1 or more power generation modules which will selectively turn on or off and additivity contribute power depending on the DC power demand. Each power generating module includes one or more pairs of a linear electrical generators connected to an internal combustion piston based power assembly. The piston in the internal combustion assembly is connected to a magnet in the linear electrical generator. The piston/magnet assembly oscillates in a simple harmonic motion; at the frequency dependent on power load of the electrical generator. A stroke limiter constrains the piston/magnet assembly motion to preset limits. A control element senses a power demand (request) and will determine how many power modules are required to meet or exceed the power demand. On time accumulation for each power module is recorded and a rotation schedule is established whereby each power module provides the same approximant energy over the overall elapsed time of operation for the power generator.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. An apparatus comprising
a first and a second electrical generator, each electrical generator comprising a respective internal combustion assembly and a respective power generator, each power generator comprising a respective inductive element, each electrical generator comprising a respective pushrod coupled between the respective internal combustion assembly and the respective power generator, the respective inductive element comprising a respective magnet coupled to the respective pushrod and a respective coil surrounding the respective magnet, the respective internal combustion assemblies configured to move the respective pushrods in an opposite direction, the first and second electrical generators configured to produce respective voltages at different phases corresponding to different power stokes of the respective internal combustion assemblies;
a capacitor;
a switching circuit coupled between the respective inductive elements of the first and second electrical generators and the capacitor for selecting the same portion of the respective differently phased voltages produced by the respective inductive elements of the first and the second electrical generators; and
a first and a second boost circuit coupled between the switching circuit and the capacitor, each boost circuit comprising the respective inductive element of the first power generator and the second power generator for boosting the respective differently phased voltages produced by the respective inductive element, and wherein outputs of the first and the second boost circuit are coupled to the capacitor to develop an output voltage.

2. The apparatus of claim 1, wherein operations of the boost circuits are synchronized to the power strokes of the respective internal combustion assemblies.

3. The apparatus of claim 1, wherein the switching circuit comprises first and second switching devices coupled to the respective inductive element of the first and second power generators.

4. The apparatus of claim 1, further comprising a pre-charge circuit coupled between the switching circuit and the capacitor, the pre-charge circuit being configured to be selectively activated to pre-charge the capacitor.

5. The apparatus of claim 1, further comprising a discharge circuit coupled to the capacitor, the discharge circuit being configured to be selectively activated to discharge the capacitor when the first and second electrical generators are not activated.

6. The apparatus of claim 1, wherein the capacitor is configured to be coupled to a high voltage battery of an electric vehicle.

7. The apparatus of claim 1, wherein the capacitor is configured to be coupled to a motor of an electric vehicle.

8. The apparatus of claim 1, wherein the capacitor is configured to be coupled to a buck/boost converter.

* * * * *